United States Patent
Edwards

[15] 3,684,206
[45] Aug. 15, 1972

[54] FILM CARTRIDGE AND PHOTOGRAPHIC WEB FOR USE THEREWITH

[72] Inventor: Evan A. Edwards, 2 Prospect Hill Rd., Pittsford, N.Y. 14534

[22] Filed: April 6, 1970

[21] Appl. No.: 25,848

[52] U.S. Cl. ............... 242/71.2, 96/78, 242/71.2, 95/31
[51] Int. Cl. ...... B02c 17/02, B02c 13/00, B07b 13/00
[58] Field of Search ...... 96/78; 242/71.2; 206/46 FM, 206/318

[56] References Cited

UNITED STATES PATENTS

| | | | |
|---|---|---|---|
| 626,356 | 6/1899 | Whitney | 96/78 |
| 981,064 | 1/1911 | Cole | 96/78 X |
| 1,037,192 | 9/1912 | Battershall | 96/78 X |
| 3,324,778 | 6/1967 | Everett | 96/78 X |
| 1,260,357 | 3/1918 | Folmer | 96/78 |
| 3,138,084 | 6/1964 | Harvey | 242/71.2 X |
| 3,482,681 | 12/1969 | Nerwin et al. | 242/71.2 X |
| 3,347,142 | 10/1967 | Steisslinger | 242/71.2 X |

*Primary Examiner*—David Klein
*Attorney*—Robert W. Hampton and D. Peter Hochberg

[57] ABSTRACT

In a double compartment roll film cartridge loaded with an elongate strip of film protected by a strip of backing paper, the leading end of the paper extends from a roll of film and paper in the film supply compartment into the film takeup compartment where it is connected to a winding core. The leading end of the film lies along the corresponding portion of the paper but is not fixed or otherwise positively attached to the paper. As the core is rotated, the film is moved by frictional engagement with the paper and is wound about the core between alternate convolutions of the paper. The backing paper has a camera lock up perforation, and a metering system in a camera for receiving the cartridge arrests advancement of the film by sensing the perforation while the trailing ends of both the film and paper are in the film passageway leading into the takeup compartment, thereby improving light-tightness of the passageways leading into the two compartments.

6 Claims, 10 Drawing Figures

PATENTED AUG 15 1972

EVAN A. EDWARDS
INVENTOR.

BY D. Peter Hochberg
Robert W. Hampton

ATTORNEYS

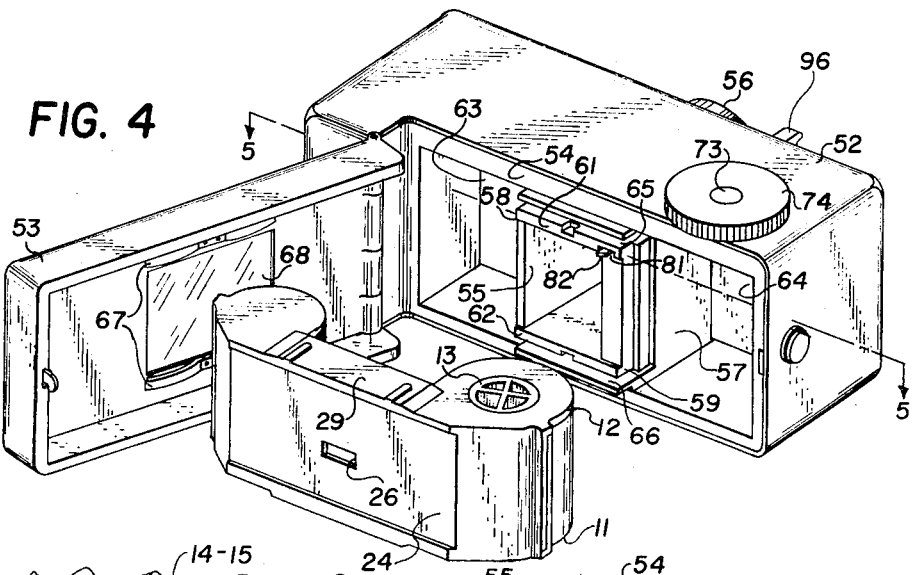
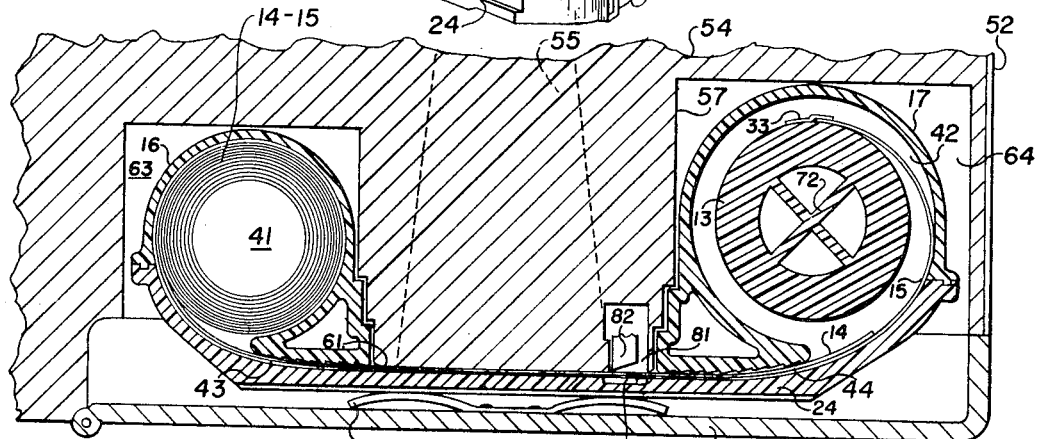
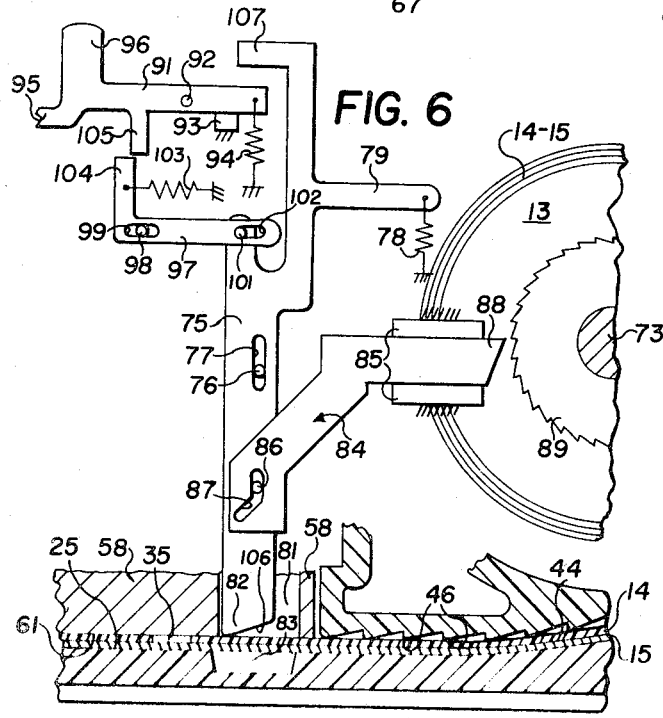

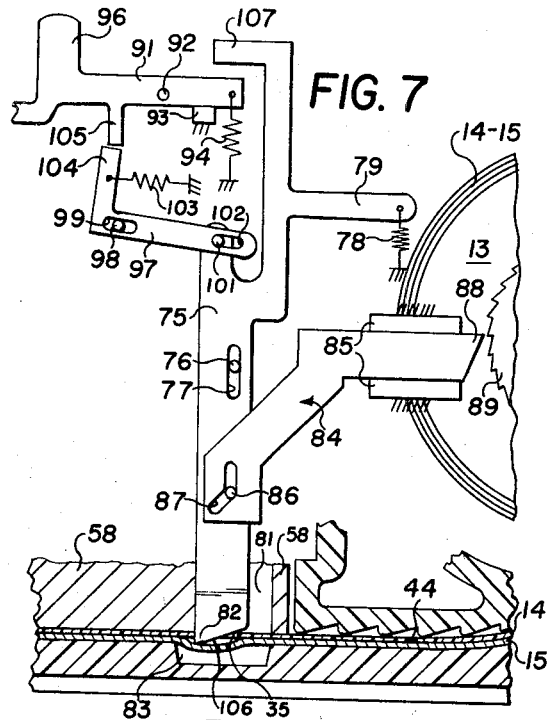
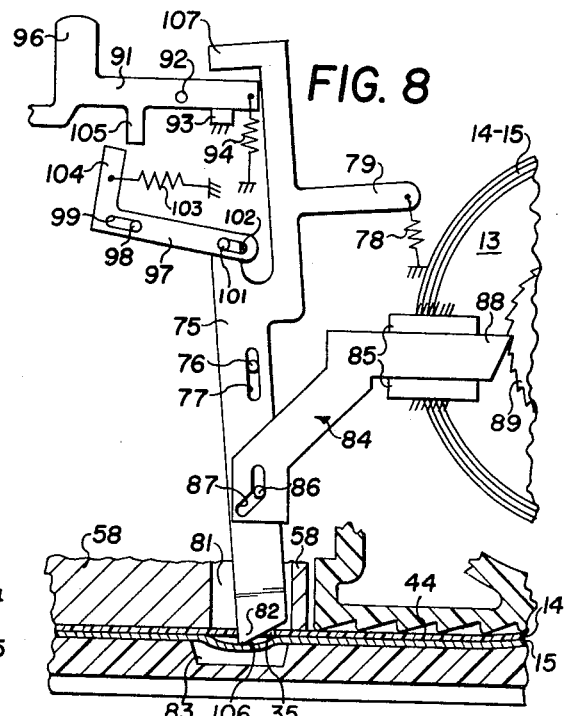
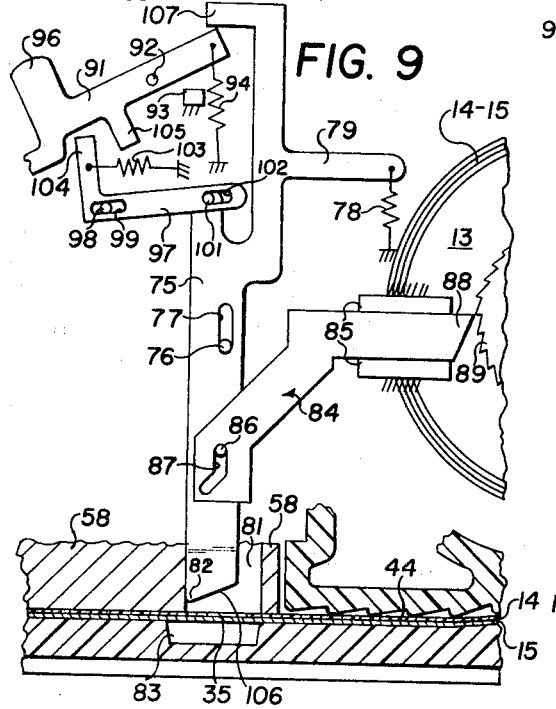
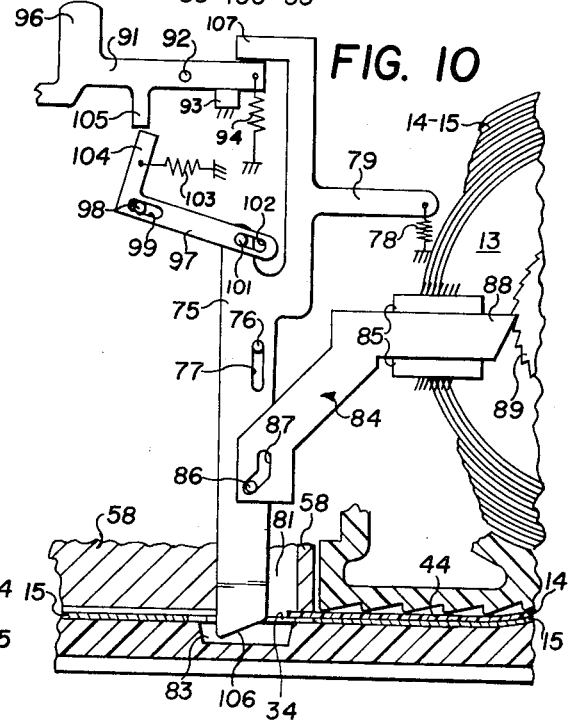

FILM CARTRIDGE AND PHOTOGRAPHIC WEB FOR USE THEREWITH

BACKGROUND OF THE INVENTION

1. Field of the Invention

The present invention relates to photography and particularly to roll film cartridges and apparatus such as a still camera using the cartridge.

2. Description of the Prior Art

It has long been known to load photographic apparatus such as still cameras with film cartridges in which a strip of film is advanced intermittently from a film supply compartment and wound onto a winding core within a film takeup compartment as successive exposures are made on the portion of the strip of film extending between the two compartments. In any such cartridge using radiation sensitive material it is, of course, important to prevent light from entering the internal film chambers defined by the two compartments, through the corresponding film passageways leading into the compartment. Consequently, in cartridges in which the leading end of a strip of film is attached directly to the winding core without benefit of a protective backing web, the film passageways are designed to receive the film as snugly as possible without impairing longitudinal movement of the film.

To provide greater protection to the film and to provide visible exposure indicia along the film, a radiation protective paper backing strip extending beyond both ends of the film also may be used. As disclosed in greater detail in commonly assigned U.S. Pat. Nos. 3,138,081 and 3,138,084, the film and paper are wound initially within the film supply chamber of the cartridge, with the leading end of the film attached to the paper by a paster tab comprising a strip of pressure sensitive tape or the like. The leading end of the paper extends through the passageway leading into the film takeup chamber and is permanently attached to a rotatably winding core. As the core is rotated, the paper draws the film between the two chambers until the leading end of the film reaches the core, whereupon both the film and the paper are wound onto the core in alternate layers.

Since the opposed areas of the surfaces of the film passageways confronting the film and paper must be spaced apart by a distance sufficient to permit the paster tab to pass, a degree of light leakage in these passageways is possible, both when the paster is not in the passageway and particularly when the takeup chamber passageway is empty after the film and paper have been wound onto the core.

SUMMARY OF THE INVENTION

An object of the present invention is to provide a web of photographic material comprising a strip of film and backing paper, and a film cartridge including such a web, wherein the film and paper are in frictional engagement only, whereby clearance need not be provided in the passageway to the cartridge takeup compartment for a paster tab connecting the web components.

Another object of the present invention is the provision of a web of photographic material wherein a plurality of discontinuities are provided for indicating the location of a frame for exposure, and an additional discontinuity is provided for indicating use of the last frame.

It is a further object of the present invention to provide, in a camera having a film advancing mechanism for advancing film past an exposure station in single frame increments, a metering mechanism, operative on an elongate film product having a discontinuity for indicating use of the last film frame thereon, which locks the film advancing mechanism to prevent further film advancement when the discontinuity is sensed.

A still further object of the present invention is the provision of a metering mechanism of the aforementioned type which additionally locks the camera exposure making means when the discontinuity is sensed.

In accordance with a preferred embodiment of the present invention, a film magazine or cartridge is provided with an elongate web comprising a filmstrip and a paper backing strip. The leading end of the backing strip is attached to a winding core within the film takeup chamber of the cartridge. The film is not attached to the paper but rather is simply in frictional contact with the paper. As a result, the usual paster tab and the manufacturing step of attaching the film, paper, and tab are dispensed with. When the cartridge is first loaded into the camera, the majority of the film and the corresponding portion of the backing paper are wound together in the film supply chamber, with the leading end of the film extending through the supply chamber and, in the illustrative preferred embodiment of the invention, at least partially along the takeup chamber passageway. As the winding core is rotated, the resulting movement of the paper tends to effect corresponding movement of the film due to the frictional contact between the leading ends of the film and paper and also between the convolutions of film and paper comprising the supply roll.

Also in accordance with the present invention, the trailing end of the film or preferably the backing paper is provided with a lock up discontinuity such as a notch. After the film has been completely exposed in the camera, the film metering mechanism senses the lock-up perforation to arrest further operation of the film winding device and the shutter operating trigger. In this condition, the trailing ends of the film and paper both remain in the film takeup chamber passageway. Hence, protection is provided against undesired exposure of the film to light both before and after the cartridge is used.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

FIG. 4 is a rear perspective view of an open camera according to the illustrative preferred embodiment of the invention and of the film cartridge illustrated in the preceding figures in position for insertion into the camera;

FIG. 5 is a cross-sectional partial plan view of the loaded camera taken through the camera and cartridge along the line 5—5 of FIG. 4;

FIG. 6 is a schematic representation of the film metering mechanism employed in the camera shown in FIGS. 4 and 5, illustrating the position of the metering mechanism components during the initial movement of the film in response to rotation of the winding core;

FIG. 7 corresponds to FIG. 6 and illustrates the respective positions of the metering mechanism components as a metering hole in the filmstrip initially comes into alignment with the metering pawl;

FIG. 8 corresponds to FIGS. 6 and 7 and shows the respective positions of the illustrated metering mechanism components as the movement of the film beyond the position shown in FIG. 7 results in arresting further advancement of the film;

FIG. 9 corresponds to FIGS. 6 through 8 and illustrates the respective positions of the metering mechanism components as the shutter is operated to effect an exposure and to restore the metering mechanism to the condition shown in FIG. 6; and FIG. 10 corresponds to FIGS. 6 through 9 and illustrates the respective positions of the components when the trailing end of the filmstrip has moved past the metering pawl.

DESCRIPTION OF THE PREFERRED EMBODIMENT

Figure 1:
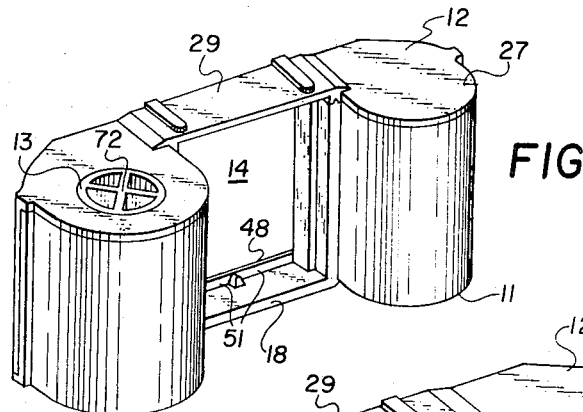
FIG. 1 is a perspective front view of a film cartridge comprising an illustrative preferred embodiment of the invention.

Because cameras are well known, the present description will be directed in particular to camera elements forming part of, or cooperating more directly with, the present invention. It is to be understood that camera elements not specifically shown or described herein are selectable from those known in the art.

As shown in FIGS. 1–4, a film magazine or cartridge embodying the present invention comprises a first or lower casing member 11, a second or upper casing member 12, a film winding core 13, an elongate web of photographic material comprising an elongate strip of film 14 and an elongate strip of opaque, protective backing material or paper 15. The lower casing member suitably is formed of molded plastic and includes a film supply compartment member 16 and a film takeup compartment member 17, joined together by a lower wall member 18. The lower ends of both film compartment members are closed by end wall members 19 and 21, respectively, with the takeup compartment containing an inwardly extending annular lip 23 for rotatably supporting the winding core 13. The upper casing member also is preferably formed of molded plastic material and comprises a relatively thick back wall member 24 curved forwardly toward its opposite ends from a flat film gate surface 25 surrounding a rectangular aperture 26. Cover members 27 and 28, which close the upper ends of the respective film supply and takeup compartment members, extend forwardly from the top edge of the back wall member and are joined by upper wall member 29 corresponding to lower wall member 18. Cover member 27 is entirely imperforate, whereas cover member 28 is provided with an opening 31 surrounded by an inwardly projecting lip 32 to permit one end of winding core 13 to be exposed.

Figure 2:
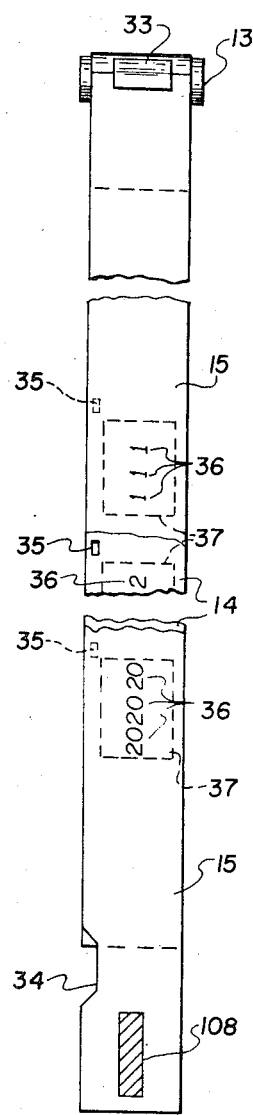
FIG. 2 is a plan view of the film product employed in the cartridge shown in FIG. 1.
Figure 3:
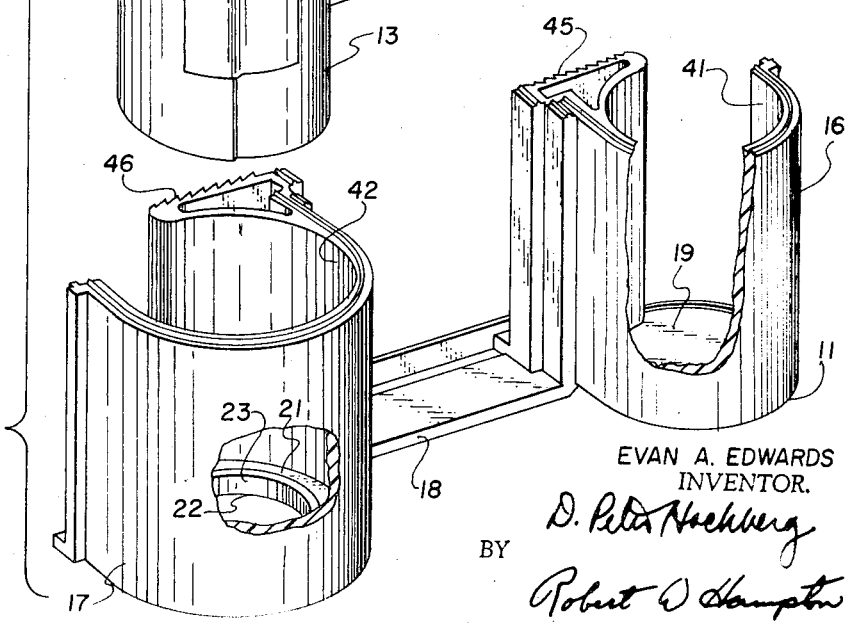
FIG. 3 is an enlarged, exploded front perspective view of the film cartridge shown in FIG. 1 with portions of the cartridge structure broken away.

As depicted in FIGS. 2 and 3, the film product employed in the subject cartridge comprises the cylindrical molded plastic winding core 13, to which the leading end of the elongate strip of protective backing paper 15 is attached by a piece of pressure sensitive tape 33 or other appropriate means. As previously described, the backing paper 15 is superimposed on the filmstrip 14 with the leading end of the film adjacent the winding core and with the trailing end of the film partially overlapping an edge notch 34 in the backing paper. Along its upper edge, the filmstrip is provided with a set of discontinuities comprising a series of uniformly spaced metering holes 35 along the same line as the backing paper notch 34. As later described, a metering pawl incorporated in the camera's film advancing mechanism cooperates with holes 35 to control advancement of the film in the camera and with notch 34 to lock up the camera after the film has been exposed. The metering holes are associated with spaced reference numerals 36 or other indicia along the back surface of the backing paper behind the corresponding film exposure frames or areas indicated in broken lines at 37. Numbers 36 are visible through aperture 26 in the back wall member of the cartridge for exposure identification purposes.

When the cartridge is assembled, the adjacent surfaces of the upper and lower casing members are sealed together in light-tight relation to one another as described in greater detail in commonly assigned copending U.S. patent application, Ser. No. 25,956, entitled "Film Cartridge and Camera," filed of even date herewith in the name of Hubert Nerwin and now abandoned. The winding core is rotatably supported in the film takeup chamber by the reception of lip 23 of the lower casing member into a mating annular groove in the lower end hub of the core, and by the reception of the corresponding opposed inwardly facing lip 32 surrounding opening 31 a like mating annular groove in the hub member as shown at numeral 39 in FIG. 3, thereby providing labyrinth light barriers at both open ends of core member 38. Accordingly, it will be seen that this construction provides film supply and takeup chambers 41 and 42 which are light-tight except along film passageways shown at 43 and 44 in FIG. 5. These passageways are defined between the rearwardly facing wall surfaces 45 and 46 of the lower casing member and the corresponding forwardly curved end surfaces of back wall member 24.

Initially, the main portions of the film 14 and backing paper 15 is wound within the film supply compartment as shown in FIGS. 3 and 5, with the leading end of the film 14 and the corresponding portion of the paper 15 extending through the film passageways. As previously indicated, these passageways are just large enough to accommodate the film and paper while permitting longitudinal movement of the film and paper, thus minimizing the possibility of light entering the film chambers past the film and paper in the passageways. Also, the subject film 14 and paper 15 preferably have same width so that their aligned edges mate closely with the corresponding top and bottom passageway surfaces. To further improve the light sealing effectiveness of the film and paper within the passageways, the rearwardly facing wall surfaces 45 and 46 may be provided with transverse grooves, as illustrated, thereby preventing grazing reflection of light along the passageways between those wall surfaces and the emulsion surface of the film. It will be understood, of course, that references herein to film passageway sizes or to distances between opposed surfaces thereof refer to effective sizes or distances as determined by those passageway surfaces contacting the film or paper; e.g., the rearwardly facing apexes of the illustrated grooved surfaces 45 and 46. As disclosed in commonly assigned copending U.S. patent application, Ser. No. 700,055, entitled "Method and Apparatus for Improving the Flatness of Roll Film in a Camera Exposure Aperture," filed in the name of Hubert Nerwin on Jan. 24, 1968, the film passageways preferably define a gradually curved film path between the film chambers and the back film gate surface 25, in order thereby to minimize distortive influences imparted to the film by abrupt curvature transitions. Also, the size of the film supply chamber in relation to the diameter of the winding core is disclosed more specifically in commonly assigned U.S. patent application, Ser. No. 25864, entitled "Elimination of Backing Paper Shortage in Roll Film Magazines," filed in the names of Robert I. Edelman and Evan A. Edwards on even date herewith which application issued on Oct. 19, 1971 as U.S. Pat. No. 3,614,012.

Between the two opposed film passageways, the film 14 and backing paper 15 extend along the flat back gate surfaces 25 of the cartridge wall member 24 between seating projections 47 and 48. These projections extend forwardly beyond surface 25 by a distance just slightly exceeding the combined thickness of the film and backing paper to provide a plurality of coplanar seating surfaces 49 and 51 forwardly of and parallel to surface 25. Since these seating projections are located beyond the edges of the portion of the film and paper between the two passageways, it will be seen that frontal access to the exposed portion of the film and paper is not obstructed by the magazine whenever the cartridge is removed from the camera.

Since the portion of the film 14 extending between the two compartments 16 and 17 is held in guided engagement with the corresponding portion of the paper 15 by the film passageways and the intermediate film exposure gate structure, the leading end of the film 14 is substantially immovable relative to the adjacent portion of the backing paper 15. Accordingly, as the paper 15 winds onto the winding core 13, the leading end of the film 14 enters the nip between the backing paper and the core and also is wound onto the core beneath the paper. During further rotation of the core, the tension developed in the convoluted film and paper snubs the film tightly to the core so that the film is, in effect, securely attached.

The camera illustrated in FIGS. 4 and 5 includes an exterior housing comprising a front casing member 52 provided with a hinged rear cover door 53 that closes the housing when latched in the closed position as partially illustrated in FIG. 5. An internal body member 54 is housed within the front casing member and includes a tapered rectangular opening 55 extending rearwardly from the camera's lens system and shutter, not shown, which are mounted in lens housing 56 and together comprise the exposure or operating station. Opening 55 is defined by an open ended boxlike structure 57 provided with a pair of rearwardly facing support rails 58 and 59. The rearwardly facing front gate surfaces 61 and 62 defined by the respective support rails 58 and 59 are in a common plane having a predetermined relation with a focal plane onto which the camera lens system focuses the image of an object within a given distance range from the camera.

When the cartridge is installed in the camera, its film supply and takeup compartments occupy corresponding receptacles 63 and 64 in the body member. Receptacles 63 and 64 are joined by horizontal channels 65 and 66 above and below the opening 55, such channels accommodating the upper and lower wall members 29 and 18 of the cartridge with the boxlike structure 57 being received between wall members 29 and 18 and between the two film compartments 16 and 17. The cover door 53 of the camera is provided with a pair of resilient spring members 67 above and below a transparent cover door window 68. When the cover door is closed, these spring members engage corresponding rearwardly facing surfaces of the magazine to urge the latter forwardly in the camera.

The various elements of the magazine and the internal camera structure which cooperate to support the magazine and to define a light-tight film gate between the two film compartments are disclosed in detail in the above-identified Nerwin application, Ser. No. 25,956 filed on even date herewith. For purposes of the present disclosure, however, the rearwardly facing surfaces 61 and 62 of the camera support rails 58 and 59 are engaged by the cartridge seating projections 47 and 48 under the influence of spring members 67, and that the edges of surfaces 61 and 62 adjacent opening 55 overlap the corresponding edge portions of the emulsion surface of the film extending between the two film compartments. Accordingly, since the seating projections extend forwardly beyond surface 25 by a distance slightly exceeding the combined thickness of the film and paper, it will be apparent that front emulsion surface of the exposure portion of the film aligned with opening 55 is supported at the focal plane of the camera lens system by the exposure gate structure comprising the forwardly facing cartridge surface 25 and the rearwardly facing regions of support rails 58 and 59 overlapping the edges of the film.

The film advancing system of the subject camera includes a winding key (not shown) which is adapted to engage the internal splines 72 shown in FIG. 5 at the upper end of winding core 13 when the cartridge is loaded into the camera. The winding key, is carried by rotatably winding shaft 73 attached to winding knob 74 shown in FIG. 4, whereby the manual rotation of the knob in a counterclockwise direction winds film and paper onto the core. The winding key is, of course, movable into and out of engagement with the winding core, either by manually operated means or by any known mechanism of the type which automatically effects such movement in response to corresponding movement of the camera's cover door.

The film metering mechanism incorporated with the film advancing system is housed within the internal body member of the camera above opening 55. As depicted in FIGS. 6 through 10, this mechanism according to the present invention includes a film engaging pawl member 75 supported by a stationary pin 76 extending through an elongate slot 77 in the pawl member. A light spring 78 attached to arm 79 of the pawl member 75 biases member 75 both rearwardly toward the film and in a clockwise direction around pin 76 thereby urging the rearward end of the pawl member into lateral contact with the adjacent surface of an opening 81 in support rail 58. The rearwardmost end of the pawl member defines a pawl tooth 82 which extends rearwardly through opening 81 into resilient engagement with the portion of the perforated upper edge of the filmstrip opposite recess 83 in the back wall member 24 of the cartridge.

When the cartridge is first installed in the camera, an imperforate area of the film spans the cartridge recess and maintains the metering pawl member against the influence of spring 78 in the position shown in FIG. 6. A dog member 84 is slidably supported between stationary guide lugs 85 and is attached to the pawl member 75 by a pin 86 projecting through an angular slot 87 in the end of the dog member 84 overlapping the pawl member 75. The opposite end of the dog member is pointed to provide a dog tooth 88 in alignment with a toothed wheel 89 attached to shaft 73 above the winding key. Due to the angular shape of slot 87, the tooth of the dog member is maintained out of engagement with wheel 89 whenever the pawl member is in the position illustrated in FIG. 6, thereby allowing the winding core to be rotated by means of knob 74.

Adjacent the forward end of the pawl member 75, a camera operating trigger lever 91 is pivotally supported by a fixed pin 92 and is biased in a clockwise direction against an abutment lug 93 by a spring 94. An arm of the trigger lever 91 partially shown at 95 is connected with the camera shutter or operating mechanism to actuate the latter when the trigger lever is moved manually to the position shown in FIG. 9 by means of the accessible pushbutton portion of the lever indicated at numeral 96. Behind the trigger lever, an L-shaped blocking arm 97 is pivotally and slidably supported by a stationary pin 98 extending through elongate slot 99 and is connected to the pawl member 75 by another pin 101 on that member extending through a second elongate slot 102 in the blocking arm 97. A spring 103 connected to the blocking arm urges it both in a clockwise direction and toward the pawl member 75. Thus, when the various elements of the metering mechanism are in their respective positions shown in FIG. 6, a forwardly extending leg 104 of the blocking arm 97 is aligned with leg 105 extending rearwardly from the trigger lever 91 to prevent shutter operating movement of that lever.

As the initial movement of the film 14 and paper 15 is effected by counterclockwise rotation of the winding core, the various components of the metering mechanism remain in their respective positions depicted in FIG. 6 until the first metering hole 35 in the film moves into alignment with the pawl tooth 82. When this occurs, the metering pawl 75 moves slightly rearwardly a predetermined amount under the influence of spring 78 to the position illustrated in FIG. 7, defined by engagement of the sloped rearward edge 106 of the pawl tooth 82 with the adjacent edge of the metering hole in which the tooth is partially received. In this position, the pawl tooth 82 locally displaces the imperforate area of the backing paper behind the metering hole but does not penetrate through the paper into recess 83. This limited rearward movement of the pawl 75, does not alter the position of the dog member 84. Also, although the blocking arm 97 is thereby pivoted about pin 98, leg 104 of that arm nevertheless remains in blocking alignment with leg 105 of the trigger lever to prevent operation of the shutter.

As the winding movement of the film continues, however, the metering hole 35 displaces the rearward end of the pawl member 75 toward the winding core, thereby sliding the dog member tooth 88 toward engagement with wheel 89 as depicted in FIG. 8 to disable the film advancing mechanism. As soon as such engagement occurs, the advancement of the film is positively arrested, with the film exposure area adjacent the first metering perforation thereby positioned in alignment with the camera lens system and with the corresponding reference numeral 36 visible through aperture 26 in the back wall member of the cartridge. Concurrently, the L-shaped blocking arm is displaced by the pawl member against the influence of spring 103 so that arm 104 no longer prevents pivotal movement of the trigger member to actuate the camera exposure mechanism.

An ear 107 at the forward end of the pawl member 75 is now located directly in the path of movement of the adjacent end of the trigger lever 91. Therefore, when the trigger lever 91 is pivoted manually to the position shown in FIG. 9 to operate the camera shutter, the end of the trigger lever 91 adjacent the pawl member 75 engages ear 107 and thereby moves the pawl member forwardly against the bias of spring 78. This movement of the pawl member 75 disengages pawl tooth 82 from the film 14 and causes pawl member 75 to assume the position shown in FIG. 9, in which the pawl tooth 82 is aligned with an imperforate area of the film immediately adjacent the metering hole 35 just vacated by that tooth. Upon the release of the trigger level 91, spring 94 returns trigger lever 91 to its former position as leg 105 thereof bypasses the corresponding leg 104 of the blocking arm 97 by sliding that arm sideways in opposition to spring 103. Since ear 107 of the pawl member 75 is disengaged by the trigger level 91 as the latter reassumes its initial position, the pawl tooth again engages the film 14, thus enabling the film advance mechanism by restoring the mechanism to its former condition shown in FIG. 6.

Consequently, the metering mechanism now allows the film to be advanced while at the same time preventing a second operation of the shutter until the next exposure area is moved into exposure position. During the subsequent operation of the camera, the metering mechanism functions in the same manner just described as each succeeding metering hole is engaged by the pawl member, thereby automatically positioning each successive film exposure area in the film exposure gate and preventing the occurrence of accidental double exposures.

After all of the available film exposure areas have been exposed, the rotation of the winding core by knob 74 moves the trailing end of the film 14 past the corresponding edge notch 34 in the backing paper 15 eventually into registration with opening 81, as shown in FIG. 10. Since the pawl member 75 then is no longer engaged with the film, pawl member 75 is moved by spring 78 to its rearwardmost position wherein pawl tooth 82 extends through the edge notch 34. Due to the angular shape of slot 87, this movement of the pawl member 75 slides the dog member 84 into blocking engagement with toothed wheel 89 to block further advancement of the film and paper. Therefore, the film advancing system is disabled from winding the trailing end portion of the film and the corresponding portion of the backing paper through the takeup chamber passageway. Concurrently, the corresponding position of the blocking arm 104 prevents the trigger from being operated to actuate the exposure mechanism, whereby both the shutter and the film advancing system remain disabled until the film cartridge is removed by the camera operation. As a result, the operator is aware that the camera is locked to prevent any further operation of the camera. With the film and backing paper so disposed within the cartridge, a distinctive indicia area along the backing paper shown at 108 in FIG. 2 is visible through cartridge aperture 26 and through the transparent cover door window 68 to indicate that the film in the cartridge has been completely exposed. It should be noted that the disabling means incorporated in the invention is distinguishable from that disclosed in U.S. Pat. No. 3,138,084, wherein the winding operation is stopped after the film has been wound onto the takeup spool by the engagement of a metering pin with a perforation in the trailing end of the backing paper. In the apparatus described herein, the film advancing system is actually disabled, rather than simply engaging the backing paper to prevent its movement. Upon removal of the cartridge from the camera, the trailing end portions of the film and backing paper continue to occupy the takeup chamber passageway, thereby effectively blocking that passageway against light which might otherwise damage the exposed film.

The invention has been described in detail with particular reference to a preferred embodiment thereof, but it will be understood that variations and modifications can be effected within the spirit and scope of the invention. For example, the film also may have a lock-up notch overlying the backing paper notch, in which case an additional length of film is accessible after the cartridge is removed. Alternatively, the metering mechanism may be used with film having no protective backing strip, in which case the film also includes the lock-up notch as described.

I claim:

1. A photographic film cartridge for use in a camera and comprising:
    a supply compartment including a supply chamber and a supply passageway in communication with said chamber:
    a takeup compartment including a takeup chamber and a takeup passageway in communication with said takeup chamber;
    a generally cylindrical takeup core rotatably housed within said takeup chamber and including gear means for use in rotating said core when said cartridge is in use in said camera;
    a photographic web comprising a photosensitive filmstrip element having a trailing portion and a leading end and a superimposed backing paper strip element having a trailing portions and a leading end, said photographic web having an initial configuration prior to said use in said camera wherein;
    said trailing portions of said elements are formed into an interwound coreless supply roll housed in said supply chamber, said backing paper element forming the outermost convolution of said roll and extending through said passageways and into said takeup chamber, said backing paper element being adhered at the leading end thereof to said takeup core and being so wound around said core as to form a nip;
    said film element extending from said supply roll and through said passageways into said takeup chamber in superimposed relationship with said backing paper element, said leading end of said film being so disposed within said nip that said leading film end, in response to rotation of said core is snubbed in predetermined relationship to said core and to said backing paper element, whereby continued rotation of said core is operable to advance said film element and said backing paper element as a unit from said supply chamber into said takeup chamber.

2. A film cartridge according to claim 1 in which said passage-ways are dimensioned to accommodate said photographic web with clearance sufficient only to allow longitudinal movement of said photographic web.

3. A film cartridge according to claim 1 wherein said film strip element contains a plurality of successively useable exposure areas and at least one of said web elements defines a discontinuity for use in restricting web movement after use of the last of the plurality of exposure areas.

4. A film cartridge according to claim 1 in which said film strip is provided with a plurality of discontinuities uniformly spaced along a line which extends from said leading film strip and to a trailing film strip end to locate a plurality of exposure frames, and said backing paper strip is provided with a discontinuity at least partially overlapped by the trailing end of said film strip.

5. A film cartridge according to claim 4 wherein said film strip discontinuities comprise edge means for defining a plurality of film strip metering holes, and said backing paper strip discontinuity comprises edge means for defining a notch aligned with said line of film strip discontinuities.

6. A composite photographic web product for use in a photographic film cartridge of the type which comprises a supply compartment including a supply chamber and a supply passageway in communication with said chamber; a takeup compartment including a takeup chamber and a takeup passageway in communication with said takeup chamber; and a generally cylindrical takeup core rotatably housed within said takeup chamber and including gear means for use in rotating said core when said cartridge is in use in a camera of a type which is cooperable with said cartridge; said web product comprising;
    a photosensitive filmstrip element having a trailing portion and a leading end, and a superimposed backing paper strip element having a trailing portion and a leading end, said web product having an initial configuration prior to said use in said camera wherein:
    said trailing portions of said elements are formed into an interwound coreless supply roll housed in said supply chamber, said backing paper element forming the outermost convolution of said roll and extending through said passageways and into said takeup chamber, said backing paper element being adhered at the leading end end thereof to said takeup core and being so wound around said core as to form a nip;

said film element extending from said supply roll and through said passageways into said takeup chamber in superimposed relationship with said backing paper element, said leading end of said film being so disposed within said nip that said leading film end is snubbed, in response to rotation of said core, in predetermined relationship to said core and to said backing paper element, whereby continued rotation of said core is operable to advance said film element and said backing paper element as a unit from said supply chamber into said takeup chamber.

* * * * *